United States Patent
Lee

(10) Patent No.: US 12,454,283 B2
(45) Date of Patent: Oct. 28, 2025

(54) SENSOR CONTROL APPARATUS PROVIDED IN VEHICLE AND METHOD PERFORMED BY THE SENSOR CONTROL APPARATUS TO REDUCE POWER CONSUMPTION OF SENSORS

(71) Applicant: HYUNDAI AUTOEVER CORP, Seoul (KR)

(72) Inventor: Hyung Ho Lee, Seongnam-sii (KR)

(73) Assignee: HYUNDAI AUTOEVER CORP, Seoul (KR)

( * ) Notice: Subject to any disclaimer, the term of this patent is extended or adjusted under 35 U.S.C. 154(b) by 0 days.

(21) Appl. No.: 18/679,872

(22) Filed: May 31, 2024

(65) Prior Publication Data
US 2024/0317258 A1    Sep. 26, 2024

Related U.S. Application Data

(62) Division of application No. 17/380,614, filed on Jul. 20, 2021, now Pat. No. 12,037,009.

(30) Foreign Application Priority Data

Jul. 20, 2020  (KR) .......................... 10-2020-0089877

(51) Int. Cl.
*B60W 60/00*    (2020.01)
*B60R 16/00*    (2006.01)
(Continued)

(52) U.S. Cl.
CPC ............ *B60W 60/001* (2020.02); *B60R 16/03* (2013.01); *B60W 30/18163* (2013.01); *B60W 2520/10* (2013.01); *B60W 2554/406* (2020.02)

(58) Field of Classification Search
CPC ......... B60W 60/001; B60W 30/18163; B60W 2554/406; B60W 2520/10; B60R 16/03
(Continued)

(56) References Cited

FOREIGN PATENT DOCUMENTS

| DE | 102018200727 A1 | 7/2019 |
|---|---|---|
| JP | 2015-055947 | 3/2015 |

(Continued)

OTHER PUBLICATIONS

Nikolaos A. Pantazis, Dimitrios J. Vergados, Dimitrios D. Vergados, Christos Douligeris, "Energy efficiency in wireless sensor networks using sleep mode TDMA scheduling," Apr. 11, 2008, Elsevier, p. 322-343. (Year: 2008).*

(Continued)

*Primary Examiner* — Tiffany P Young
(74) *Attorney, Agent, or Firm* — Morgan Lewis & Bockius LLP

(57) ABSTRACT

In a method performed by a sensor control apparatus provided in a vehicle, the method includes obtaining road driving information received through a wireless communication interface provided in the vehicle, selecting an object undetected area from a plurality of adjacent areas of the vehicle using the road driving information, obtaining sensing data from each of a plurality of sensors provided in the vehicle, selecting an object undetected area from the adjacent areas using the sensing data, and determining an undetected area. The undetected area is selected as an object undetected area from the adjacent areas both when the road driving information is used and when the sensing data is used, as a power saving area. In addition, the method further includes outputting a control signal for controlling power saving target sensors, which are some of the sensors corresponding to the power saving area, to operate in a power saving mode.

6 Claims, 13 Drawing Sheets

(51) Int. Cl.
*B60R 16/03* (2006.01)
*B60W 30/18* (2012.01)

(58) Field of Classification Search
USPC .......................................................... 701/25
See application file for complete search history.

(56) References Cited

FOREIGN PATENT DOCUMENTS

| | | |
|---|---|---|
| JP | 2017-160761 | 9/2017 |
| JP | 2019-020351 | 2/2019 |
| JP | 2019-158589 | 9/2019 |
| JP | 2020-035034 | 3/2020 |
| KR | 10-2012-0111896 | 10/2012 |
| KR | 10-2019-0089793 | 7/2019 |
| KR | 10-1000080 | 12/2019 |
| KR | 10-2020-0013138 | 2/2020 |
| KR | 10-2020-0075121 | 6/2020 |
| WO | WO-2021166411 A | 8/2021 |

OTHER PUBLICATIONS

Jason A. Fuemmeler, Venugopal V. Veeravalli, "Smart Sleeping Policies for Energy Efficient Tracking in Sensor Networks," May 2008, IEEE, Valume 56, No. 5, p. 2091-2101. (Year: 2008).*

* cited by examiner

SENSOR CONTROL APPARATUS PROVIDED IN VEHICLE AND METHOD PERFORMED BY THE SENSOR CONTROL APPARATUS TO REDUCE POWER CONSUMPTION OF SENSORS

The present application is a divisional of U.S. patent application Ser. No. 17/380,614, filed Jul. 20, 2021, which claims the benefit of Korean Patent Application No. 10-2020-0089877, filed on Jul. 20, 2020, in the Korean Intellectual Property Office, the disclosure of which is incorporated herein in its entirety by reference.

BACKGROUND

1. Field

The present disclosure relates to a sensor control apparatus provided in a vehicle and a method performed by the sensor control apparatus to reduce power consumption of sensors, and more particularly, to a sensor control apparatus provided in a vehicle to control power consumption of sensors in the vehicle and a method performed by the sensor control apparatus to reduce power consumption of the sensors.

2. Description of the Related Art

An autonomous vehicle recognizes a driving environment, for example, recognizes a vehicle ahead or detects an obstacle in real time using various types of sensors built in the vehicle and informs the driver of the driving environment or judges the driving environment in real time and responds to it by itself.

To perform these functions, the autonomous vehicle is equipped with various sensor devices such as a scanning device, a camera, a radar and a lidar and is loaded with software for controlling and autonomous driving of the vehicle so that the vehicle can automatically operate according to set conditions.

However, excessive power may be used to operate all the sensors built in the autonomous vehicle at once while driving.

In addition, in the case of an autonomous vehicle capable of fifth-generation (5G)-based wireless network communication, power consumption in the vehicle increases exponentially during operation. Thus, it is necessary to efficiently control power.

However, since sensors built in an autonomous vehicle are key resources for ensuring safety during autonomous driving, unconditional power saving is not a solution.

Therefore, it is required to come up with a method of reducing power consumption of sensors within a range in which safety is ensured.

SUMMARY

Aspects of the present disclosure provide a sensor control apparatus provided in a vehicle and capable of efficiently managing power consumption by controlling the operation of sensors built in the vehicle by analyzing a driving environment of the vehicle and a method performed by the sensor control apparatus to reduce power consumption of the sensors.

Aspects of the present disclosure also provide a sensor control apparatus provided in a vehicle and capable of reducing power consumption of sensors built in the vehicle within a range in which the safety of vehicle driving is ensured and a method performed by the sensor control apparatus to reduce power consumption of the sensors.

Aspects of the present disclosure also provide a sensor control apparatus provided in a vehicle and capable of rapidly changing the operation mode of sensors built in the vehicle to efficiently manage power consumption when a driving environment of the vehicle changes and a method performed by the sensor control apparatus to reduce power consumption of the sensors.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a method of reducing power consumption of sensors, the method being performed by a sensor control apparatus provided in a vehicle. The method comprises obtaining road driving information received through a wireless communication interface provided in the vehicle, selecting a first set of object undetected areas among a plurality of adjacent areas of the vehicle based on the road driving information; obtaining sensing data from each of a plurality of sensors provided in the vehicle; selecting a second set of object undetected areas among the plurality of adjacent areas based on the sensing data; designating, as a power saving area, an undetected area which belongs both to the first set of the object undetected areas and the second set of the object undetected areas; and outputting a control signal for controlling power saving target sensors to operate in a power saving mode, wherein the power saving target sensors correspond to the power saving area.

According to an aspect of the present disclosure, there is provided a method further comprising: monitoring the power saving area using the road driving information, and automatically outputting a control signal for controlling the power saving target sensors to operate in a normal mode according to the monitoring result.

According to an aspect of the present disclosure, there is provided a method, wherein the monitoring of the power saving area comprises determining whether the power saving area has changed from an object undetected area to an object detected area, and the automatically outputting of the control signal for controlling the power saving target sensors to operate in the normal mode comprises automatically outputting a control signal for controlling the power saving target sensors to operate in the normal mode in response to the determination that the power saving area has changed to an object detected area.

According to an aspect of the present disclosure, there is provided a method further comprising: determining whether the vehicle has started to change lanes, and automatically outputting a control signal for controlling at least some of the power saving target sensors to operate in the normal mode based on determining that the vehicle has started to change lanes.

According to an aspect of the present disclosure, there is provided a method, wherein the designating as the power saving area comprises: designating, as power saving areas, all areas which belong to at least one of the first set of object undetected areas and the second set of object undetected areas, when a battery level of the vehicle is equal to or higher than a first level; and designating, as power saving areas, the undetected area when the battery level of the vehicle is lower than a second level, wherein the first level indicates the amount of residual power equal to or higher than the second level.

According to an aspect of the present disclosure, there is provided a method, wherein the designating as the power saving area, the undetected area, comprises designating only a part of the undetected area as the power saving area using the road driving information.

According to an aspect of the present disclosure, there is provided a method, wherein the designating only a part of the undetected area as the power saving area comprises: obtaining a power-savable maximum traffic volume corresponding to the undetected area; and designating the undetected area as the power saving area only when the traffic volume around the vehicle according to traffic volume information in the road driving information is less than the power-savable maximum traffic volume.

According to an aspect of the present disclosure, there is provided a method, wherein the outputting of the control signal comprises automatically setting an autonomous driving mode of the vehicle to a lane change suppression mode when the power saving area includes at least one of a left front area of the vehicle and a right front area of the vehicle.

According to an aspect of the present disclosure, there is provided a method, wherein the automatically setting of the autonomous driving mode of the vehicle to the lane change suppression mode comprises automatically setting the autonomous driving mode of the vehicle to the lane change suppression mode when the power saving area includes at least one of a left front area, a right front area, a left area, and a right area.

According to another aspect of the present disclosure, there is provided a method of reducing power consumption of sensors, the method being performed by a sensor control apparatus provided in a vehicle. The method comprises obtaining road driving information through a wireless communication interface provided in the vehicle; determining a power saving required area among a plurality of adjacent areas of the vehicle using the road driving information; obtaining sensing data from a plurality of sensors provided in the vehicle; determining an object undetected area among the plurality of adjacent areas using the sensing data; designating a power saving area based on the power saving required area and the object undetected area; and outputting a control signal for controlling at least one sensor to operate in a power saving mode, wherein the at least one sensor corresponds to the power saving area.

According to an aspect of the present disclosure, there is provided a method, wherein the determining of the power saving required area comprises obtaining a traffic volume corresponding to a location of the vehicle using the road driving information; and determining the power saving required area such that the power saving required area decreases as the traffic volume increases.

According to an aspect of the present disclosure, there is provided a method, wherein the determining of the power saving required area comprises obtaining a traffic volume corresponding to a location of the vehicle using the road driving information, and determining the power saving required area such that the power saving required area decreases as the traffic volume increases when the traffic volume is less than a congestion reference volume and determining all adjacent areas except for a front area as power saving required areas when the traffic volume is equal to or greater than the congestion reference volume.

According to an aspect of the present disclosure, there is provided a method, wherein the determining of the power saving required area comprises obtaining a traffic volume corresponding to a location of the vehicle using the road driving information, and determining the power saving required area such that the power saving required area decreases as the traffic volume increases when the traffic volume is less than a congestion reference volume and determining all adjacent areas except for a front area, a left front area and a right front area as power saving required areas when the traffic volume is equal to or greater than the congestion reference volume.

According to another aspect of the present disclosure, there is provided a method of reducing power consumption of sensors, the method being performed by a sensor control apparatus provided in a vehicle. The method comprises obtaining driving state information of the vehicle, determining whether the vehicle has started to change lanes, and outputting a control signal for controlling a first set of sensors, among a plurality of sensors provided in the vehicle, to operate in a power saving mode when it is determined that the vehicle has started to change lanes, wherein the first set of sensors correspond to a direction opposite to the direction of the lane change.

According to an aspect of the present disclosure, there is provided a method further comprising: determining whether the vehicle has finished changing lanes using at least a part of the driving state information, and outputting a control signal for controlling the first set of sensors operating in the power saving mode to switch to a normal mode when it is determined that the vehicle has finished changing lanes.

According to an aspect of the present disclosure, there is provided a method, wherein the outputting of the control signal comprises obtaining road driving information through a wireless communication interface provided in the vehicle; obtaining the degree of congestion at a location of the vehicle using the road driving information; and outputting a control signal for controlling the first set of sensors to operate in the power saving mode when the degree of congestion is less than a congestion reference level and when it is determined that the vehicle has started to change lanes.

According to an aspect of the present disclosure, there is provided a method, wherein the outputting of the control signal comprises obtaining a driving speed of the vehicle using at least a part of the driving state information, and outputting a control signal for controlling the first set of sensors to operate in the power saving mode when the driving speed is equal to or higher than a predefined speed and when it is determined that the vehicle has started to change lanes.

According to an aspect of the present disclosure, there is provided a method, wherein the outputting of the control signal comprises obtaining sensing data from a plurality of sensors provided in the vehicle; determining whether a first adjacent area, among a plurality of adjacent areas, is an object undetected area using the sensing data, the first adjacent area corresponding to a direction opposite to the direction of the lane change; and outputting a control signal for controlling the first set of sensors to operate in the power saving mode when the adjacent area corresponding to the direction opposite to the direction of the lane change is an object undetected area and when it is determined that the vehicle has started to change lanes.

According to an aspect of the present disclosure, there is provided a method, wherein the outputting of the control signal further comprises obtaining road driving information through a wireless communication interface provided in the vehicle and determining whether an adjacent area, which corresponds to a direction opposite to the direction of the lane change among the adjacent areas, is an object undetected area using the road driving information, and the outputting of the control signal for controlling some sensors, which correspond to the direction opposite to the direction of the lane change among the sensors provided in the vehicle, to operate in the power saving mode when the adjacent area corresponding to the direction opposite to the direction of the lane change is the object undetected area and when it is determined that the vehicle has started to change lanes comprises outputting a control signal for controlling some sensors, which correspond to the direction opposite to the direction of the lane change among the sensors provided in the vehicle, to operate in the power saving mode when the adjacent area corresponding to the direction opposite to the direction of the lane change is determined as an object undetected area based on both the road driving information and the sensing data and when it is determined that the vehicle has started to change lanes.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
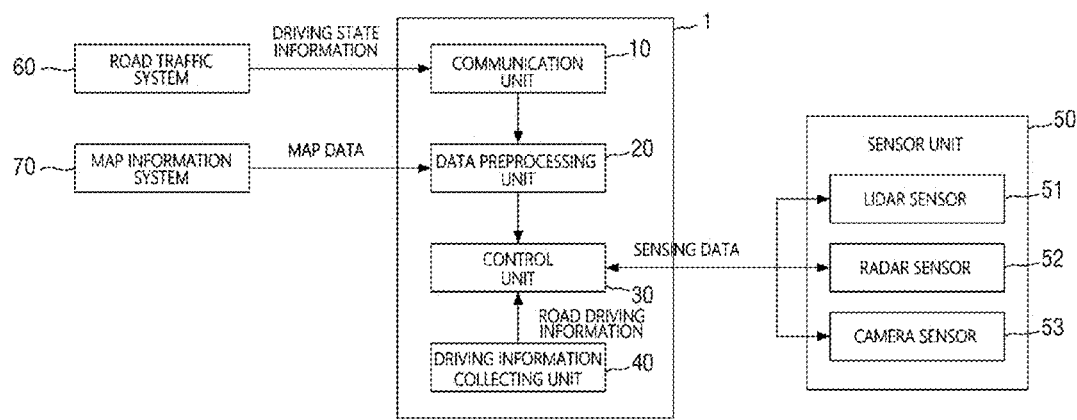
FIG. 1 illustrates the configuration of a sensor control apparatus according to an embodiment of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

FIG. 1 illustrates the configuration of a sensor control apparatus 1 according to an embodiment of the present disclosure.

Referring to FIG. 1, the sensor control apparatus 1 according to the embodiment of the present disclosure includes a communication unit 10, a data preprocessing unit 20, a control unit 30, and a driving information collecting unit 40. The sensor control apparatus 1 may be implemented as, for example, an electronic control unit (ECU) of a vehicle. Elements included in the sensor control apparatus 1 are not limited by the embodiment of the present disclosure, and other additional elements may also be included.

As for each element, the communication unit 10 communicates with an external device using a wireless communication method. The communication unit 10 may transmit and receive data using a wireless communication method such as fifth-generation (5G) mobile communication. The method by which the communication unit 10 communicates is not limited to the above method, and the communication unit 10 may also communicate using other communication methods.

The communication unit 10 communicates with a road traffic system 60 using a wireless communication method and receives road driving information provided by the road traffic system 60. The information provided by the road traffic system 60 includes, for example, driving information such as the traffic volume of each road in each area, the average driving speed, and the lane and speed of each vehicle.

The data preprocessing unit 20 obtains the road driving information received from the road traffic system 60 through the communication unit 10 and receives map data provided by a map information system 70.

The map information system 70 may be, for example, a navigation system installed in a vehicle. The map information system 70 may provide high-definition (HD) map data. The HD map is a map for providing detailed information about roads and surrounding terrain to an autonomous vehicle and has an accuracy within an error range of 10 cm. The HD map provides information such as traffic lights, signs, curbs, road marks and various structures as well as lane-level information such as road centerlines and boundary lines as a three-dimensional (3D) digital image.

The data preprocessing unit 20 extracts and processes only data related to a corresponding vehicle using the road driving information provided from the road traffic system 60 and the map data provided from the map information system 70. For example, the data preprocessing unit 20 may extract the traffic volume and average driving speed of the road on which the vehicle is travelling from the road driving information. In addition, the data preprocessing unit 20 may extract information about lanes, signal lights, and various structures of the road on which the vehicle is travelling from the map data.

The data preprocessing unit 20 may provide the extracted information to the control unit 30 so that the control unit 30 can determine whether other vehicles or obstacles exist in an area adjacent to the vehicle.

The driving information collecting unit 40 collects driving state information from the inside of the vehicle and sends the collected driving state information to the control unit 30. The driving state information may include data regarding a driving state and driving conditions. For example, the driving state may include information about whether traffic is congested or flowing freely based on the driving speed. The driving conditions may include information about whether the vehicle is stopped, is driving while maintaining a current lane, or is changing lanes due to activation of a turn signal.

The driving state information collected by the driving information collecting unit 40 may be generated from data such as a steering angle, whether a turn signal is turned on, the speed of the vehicle, and a lane change signal in the case of an autonomous vehicle.

A sensor unit 50 includes a plurality of sensors provided in the vehicle. The sensor unit 50 may include a lidar sensor 51, a radar sensor 52, and a camera sensor 53, and each sensor may be provided in plural numbers at a corresponding position to sense adjacent areas such as areas in front of, behind, and to the sides of the vehicle. Types of sensors included in the sensor unit 50 are not limited by the embodiment of the present disclosure, and various types of sensors for an autonomous driving function of the vehicle may be included.

The lidar sensor 51 senses adjacent areas including areas in front of and behind the vehicle using a laser light source. The lidar sensor 51 is located at the front inside the vehicle, for example, under the windshield and transmits and receives a laser light source through the windshield. The lidar sensor 51 may be composed of a laser transmission module, a laser detection module, a signal collection and processing module, and a data transmission/reception module. The laser light source may have a wavelength in a wavelength range of 250 nm to 11 μm, or wavelength variable laser light sources may be used. In addition, the lidar sensor 51 may be classified as a time of flight (TOF) type or a phase shift type according to a signal modulation method.

The radar sensor 52 senses adjacent areas including areas in front of, behind, and to the sides of the vehicle using electromagnetic waves. The radar sensor 52 may measure the distance, speed, or angle of an object using electromagnetic waves. The radar sensor 52 may sense an object up to 150 meters ahead in a horizontal angle range of 30 degrees by using a frequency modulation carrier wave (FMCW) method or a pulse carrier method. The radar sensor 52 may use a 77 GHz band radar or other suitable bands.

The camera sensor 53 senses adjacent areas including areas in front of, behind, and to the sides of the vehicle through a lens. The camera sensor 53 senses an image of a subject photographed through the lens. The camera sensor 53 may include an image array sensor disposed on a printed circuit board (PCB) 30 and composed of pixels. For example, the camera sensor 53 may include a complementary metal oxide semiconductor (CMOS) photosensor array or a charge-coupled device (CCD) photosensor array.

Data sensed by the lidar sensor 51, the radar sensor 52, and the camera sensor 53 may be transmitted to the control unit 30, so that the control unit 30 can determine whether other vehicles or obstacles exist in an area adjacent to the vehicle.

The control unit 30 controls the overall operation of the sensor control apparatus 1. The control unit 30 may include a central processing unit (CPU), a micro-processor unit (MPU), a micro-controller unit (MCU), or any form of processor well known in the art to which the present disclosure pertains. In addition, the control unit 30 may perform an operation on at least one application or program for executing methods according to embodiments of the present disclosure which will be described later.

The control unit 30 receives data obtained by processing the road driving information and the map data based on the vehicle from the data preprocessing unit 20. Here, the road driving information is obtained from the road traffic system 60, and the map data is obtained from the map information system 70. In addition, the control unit 30 receives data sensed by the lidar sensor 51, the radar sensor 52 and the camera sensor 53 and obtains the driving state information from the driving information collecting unit 40.

The control unit 30 selects a first object undetected area in which an object is not detected from among a plurality of adjacent areas of the vehicle by using the road driving information. Here, when the first object undetected area is selected, the map data provided from the map information system 70 may be additionally used.

In addition, the control unit 30 selects a second object undetected area from among the adjacent areas by using sensing data received from the lidar sensor 51, the radar sensor 52, and the camera sensor 53.

The control unit 30 determines both the first object undetected area and the second object undetected area selected as described above as power saving areas.

When the power saving areas are determined as described above, the control unit 30 may output a control signal for controlling sensors, which sense the power saving areas among the lidar sensor 51, the radar sensor 52 and the camera sensor 53 included in the sensor unit 50, to operate in a power saving mode.

As described above, the sensor control apparatus 1 according to the embodiment of the present disclosure can efficiently manage power consumption by controlling the operation of the sensors built in the vehicle by analyzing the driving environment of the vehicle.

FIGS. 2 through 6 are flowcharts illustrating methods of reducing power consumption of sensors according to embodiments of the present disclosure. The methods according to the current embodiments may be executed by a computing device, for example, by the sensor control apparatus 1.

The computing device executing the methods according to the current embodiments may be a computing device equipped with an application program execution environment. The subject of some operations included in the methods according to the current embodiments may not be specified, in which case it should be noted that the subject is the computing device.

Figure 2:
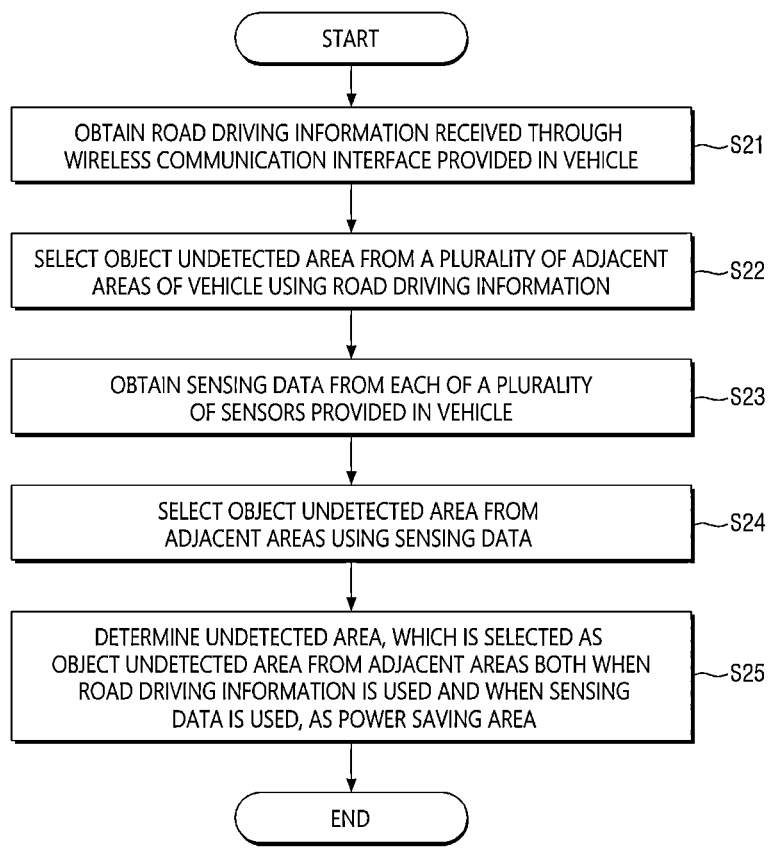
FIGS. 2 through 6 are flowcharts illustrating methods of reducing power consumption of sensors according to embodiments of the present disclosure.

Referring to FIG. 2, first, in operation S21, road driving information received through a wireless communication interface provided in a vehicle is obtained.

In operation S22, an object undetected area is selected from a plurality of adjacent areas of the vehicle using the road driving information obtained in operation S21. Here, the object undetected area may be, for example, an area in which a vehicle, an obstacle, or a person is not detected.

In operation S23, sensing data is obtained from each of a plurality of sensors provided in the vehicle. In operation S24, an object undetected area is selected from the adjacent areas using the sensing data obtained in operation S23.

Next, in operation S25, an undetected area selected as an object undetected area from the adjacent areas both when the road driving information is used and when the sensing data is used is determined as a power saving area. That is, since an area in which an object is not detected is determined as a power saving area by not using only one piece of information but using both the road driving information and the sensing data, a higher level of safety can be ensured.

Here, operation S25 may include an operation of determining all adjacent areas, which are selected as object undetected areas from the adjacent areas when the road driving information is used or when the sensing data is used, as power saving areas when a battery level of the vehicle is equal to or higher than a first level and an operation of determining the undetected area as a power saving area when the battery level of the vehicle is lower than a second level. Accordingly, when the battery level is lower than a reference level, both an object undetected area selected based on the road driving information and an object undetected area selected based on the sensing data may be selected as power saving areas, thereby maximizing a reduction in power consumption of the sensors.

In an embodiment, operation S25 may include an operation of determining only a part of the undetected area as a power saving area using the road driving information. Here, operation S52 may include an operation of obtaining a power-savable maximum traffic volume of the undetected area and an operation of determining the undetected area as a power saving area only when the traffic volume around the vehicle according to traffic volume information in the road driving information is less than the power-savable maximum traffic volume.

Accordingly, not the whole of even a surely object undetected area is determined as a power saving area. Instead, only a part of the object undetected area may be selected as a power saving area in consideration of traffic volume using the road driving information, thereby further increasing safety. For example, the power-savable maximum traffic volume may be defined in advance for the undetected area, and the undetected area may be determined as a power saving area only when the traffic volume around the vehicle is less than the power-savable maximum traffic volume.

Finally, in operation S26, a control signal for controlling power saving target sensors, which are some of the sensors corresponding to the power saving area, to operate in a power saving mode is output.

In an embodiment, operation S26 may include an operation of automatically setting an autonomous driving mode of the vehicle to a lane change suppression mode when the power saving area includes at least one of a left front area and a right front area. Here, operation S26 may include an operation of automatically setting the autonomous driving mode of the vehicle to the lane change suppression mode when the power saving area includes at least one of a left front area, a right front area, a left area, and a right area. That is, when one or more of a left front side, a right front side, a left side, and a right side are determined as a power saving area, sensors corresponding to the power saving area cannot prepare for a sudden danger that may occur in left and right lanes because they operate in the power saving mode. Therefore, in this case, the mode may be switched to the lane change suppression mode to further increase safety.

In an embodiment, the method according to the current embodiment may further include an operation of monitoring the power saving area using the road driving information and an operation of automatically outputting a control signal for controlling the power saving target sensors to operate in a normal mode according to the monitoring result.

Here, the operation of monitoring the power saving area using the road driving information may include an operation of determining whether the power saving area has changed from an object undetected area to an object detected area, and the operation of automatically outputting the control signal for controlling the power saving target sensors to operate in the normal mode may include an operation of automatically outputting a control signal for controlling the power saving target sensors to operate in the normal mode in response to the determination that the power saving area has changed to an object detected area.

Accordingly, when it is determined based on the road driving information received through 5G that the risk of the power saving area has increased, the sensors in the power saving mode may be automatically restored to the normal mode.

In an embodiment, the method according to the current embodiment may further include an operation of determining whether the vehicle has started to change lanes and an operation of automatically outputting a control signal for controlling at least some of the power saving target sensors to operate in the normal mode when determining that the vehicle has started to change lanes. For example, when it is determined that the vehicle has started to change lanes using information such as whether a turn signal is turned on or a handle steering angle, at least some of the power saving target sensors may be automatically restored to the normal mode.

As described above, in the method according to the embodiment of the present disclosure, it is possible to efficiently manage power consumption by controlling the operation of the sensors built in the vehicle by analyzing the driving environment of the vehicle. In addition, it is possible to reduce the power consumption of the sensors built in the vehicle within a range in which the safety of vehicle driving is ensured.

Figure 3:
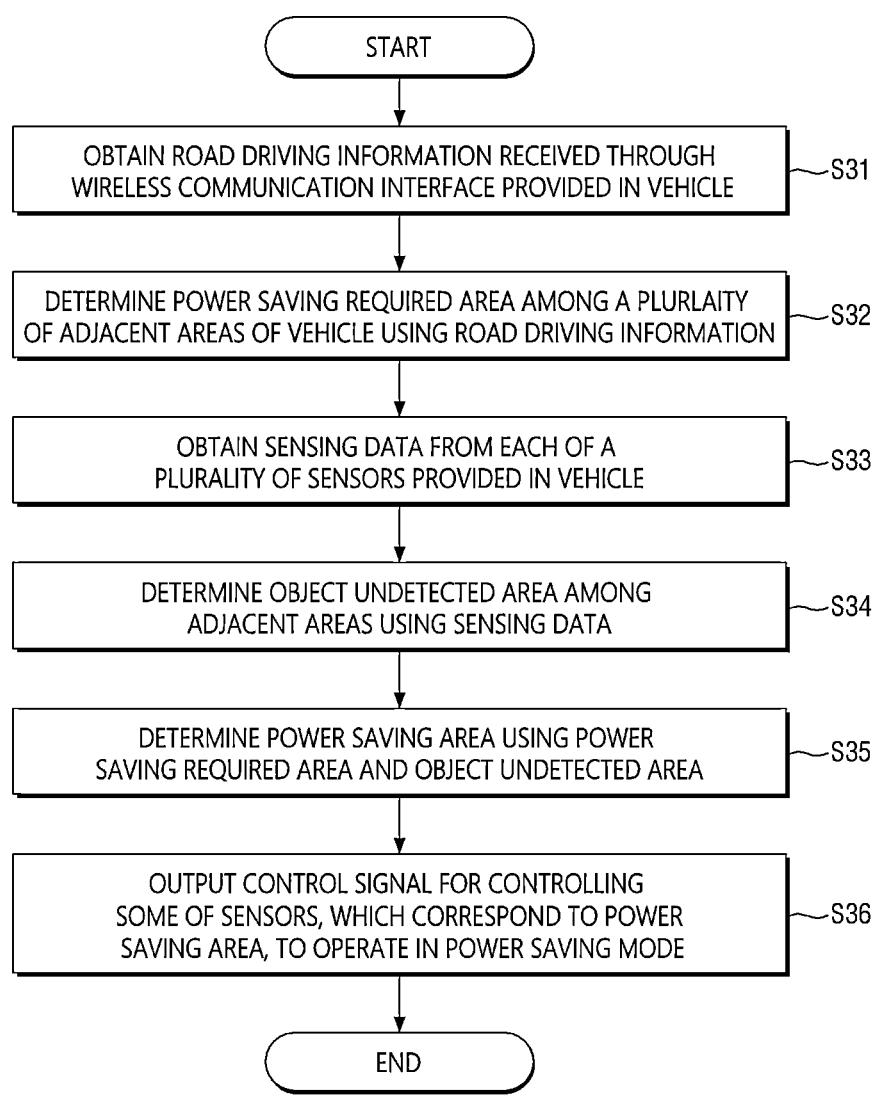

Referring to FIG. 3, first, in operation S31, road driving information received through a wireless communication interface provided in a vehicle is obtained.

Next, in operation S32, a power saving required area is determined among a plurality of adjacent areas of the vehicle using the road driving information. Unlike in an object undetected area, in the power saving required area, even if an object is detected, sensors may be set to a power saving mode or may be turned off.

Here, operation S32 may include an operation of obtaining a traffic volume near the location of the vehicle using the road driving information and an operation of determining a power saving required area such that the power saving required area decreases as the traffic volume increases. That is, a smaller power saving required area may be determined when the traffic volume is high than when the traffic volume is low.

In an embodiment, operation S32 may include an operation of obtaining a traffic volume near the location of the vehicle using the road driving information and an operation of determining a power saving required area such that the power saving required area decreases as the traffic volume increases when the traffic volume is less than a congestion reference volume and determining all adjacent areas except for a front area as power saving required areas when the traffic volume is equal to or greater than the congestion reference volume. For example, when the volume of traffic around the vehicle obtained from the road driving information exceeds a reference volume, it is determined that the traffic is congested. Accordingly, all areas except for a front area may be determined as power saving required areas.

In addition, operation S32 may include an operation of obtaining a traffic volume near the location of the vehicle using the road driving information and an operation of determining a power saving required area such that the power saving required area decreases as the traffic volume increases when the traffic volume is less than a congestion reference volume and determining all adjacent areas except for a front area, a left front area and a right front area as power saving required areas when the traffic volume is equal to or greater than the congestion reference volume. For example, when the volume of traffic around the vehicle obtained from the road driving information exceeds a reference volume, it is determined that the traffic is congested. Accordingly, all areas except for the front area, the left front area, and the right front area may be determined as power saving required areas.

As described above, even if an object is detected, when traffic is congested, sensors corresponding to all areas except for some areas ahead may be operated in the power saving mode.

In operation S33, sensing data is obtained from each of a plurality of sensors provided in the vehicle. In operation S34, an object undetected area is determined among the adjacent areas using the sensing data.

Next, in operation S35, a power saving area is determined using the power saving required area and the object undetected area determined in operations S32 and S34.

Finally, in operation S36, a control signal for controlling some of the sensors, which correspond to the power saving area determined in operation S35, to operate in the power saving mode is output.

As described above, in the method according to the embodiment of the present disclosure, sensors corresponding to an area in which traffic is congested or an object is detected among the adjacent areas of the vehicle may be switched to the power saving mode using traffic volume information provided from the external road driving information and the sensing data measured from the sensors.

Figure 4:
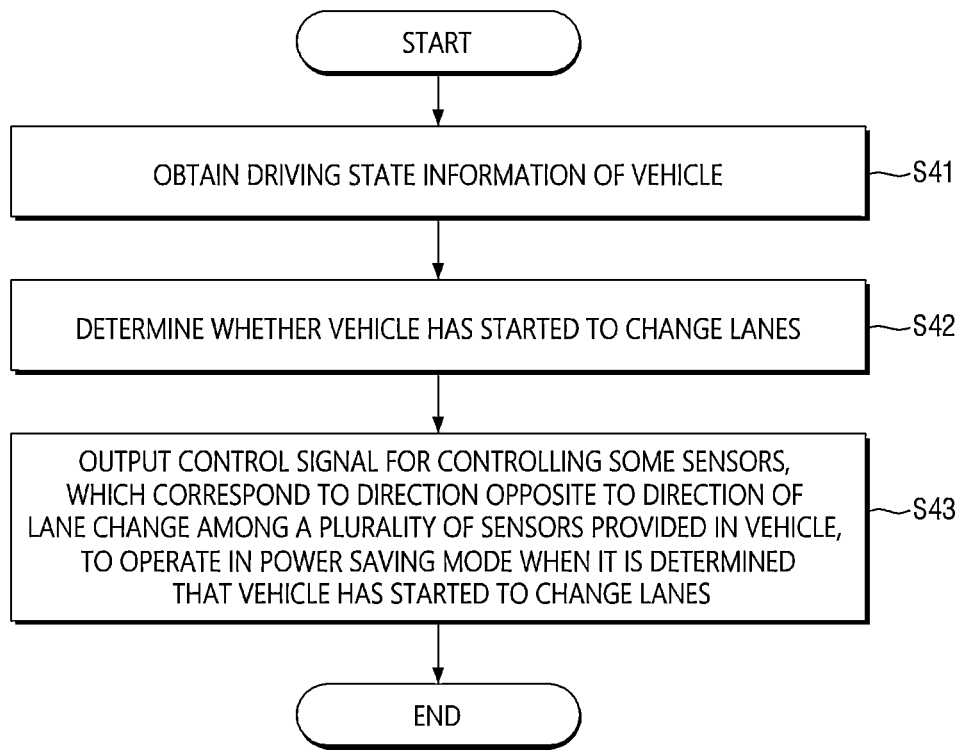

Referring to FIG. 4, first, in operation S41, driving state information of a vehicle is obtained. In operation S42, it is determined whether the vehicle has started to change lanes. Here, the driving state information may be obtained from data such as a steering angle, whether a turn signal is turned on, the speed of the vehicle, and a lane change signal in the case of an autonomous vehicle.

The driving state information may include information about whether traffic is congested or flowing freely based on the driving speed. In addition, the driving state information may include information about driving conditions such as whether the vehicle is stopped, is driving while maintaining a current lane, or is changing lanes due to activation of a turn signal.

Next, in operation S43, when it is determined that the vehicle has started to change lanes, a control signal for controlling some sensors, which correspond to a direction opposite to the direction of the lane change among a plurality of sensors provided in the vehicle, to operate in a power saving mode is output.

In an embodiment, operation S43 may include an operation of obtaining road driving information received through a wireless communication interface provided in the vehicle, an operation of obtaining the degree of congestion in the areas adjacent to the vehicle using the road driving information, and an operation of, when the degree of congestion is less than a congestion reference level and when it is determined that the vehicle has started to change lanes, outputting a control signal for controlling some sensors, which correspond to a direction opposite to the direction of the lane change among a plurality of sensors provided in the vehicle, to operate in the power saving mode.

As described above, when the vehicle changes lanes, if the road is not congested, sensors located in a direction opposite to the direction of the lane change are switched to the power saving mode, thereby reducing power consumption. Here, even if an area in the direction opposite to the direction of the lane change is an area in which an object is detected, sensors located in the direction opposite to a lane to which the vehicle moves may be set to the power saving mode.

In an embodiment, operation S43 may include an operation of obtaining a driving speed of the vehicle using at least a part of the driving state information and an operation of, when the driving speed is equal to or higher than a predefined reference speed and when it is determined that the vehicle has started to change lanes, outputting a control signal for controlling some sensors, which correspond to a direction opposite to the direction of the lane change among a plurality of sensors provided in the vehicle, to operate in the power saving mode.

Accordingly, even if there is a lane change, sensors corresponding to a direction opposite to the direction of the lane change may be switched to the power saving mode only when the driving speed of the vehicle is equal to or higher than the predefined reference speed (e.g., 30 km/h or higher).

In an embodiment, operation S43 may include an operation of obtaining sensing data from each of a plurality of sensors provided in the vehicle, an operation of determining whether an adjacent area, which corresponds to a direction opposite to the direction of a lane change among a plurality of adjacent areas defined based on the center of the vehicle, is an object undetected area using the sensing data, and an operation of outputting a control signal for controlling some sensors, which correspond to the direction opposite to the direction of the lane change among the sensors provided in the vehicle, to operate in the power saving mode when the adjacent area corresponding to the direction opposite to the direction of the lane change is an object undetected area and when it is determined that the vehicle has started to change lanes.

For example, even if there is lane change, sensors corresponding to a direction opposite to the direction of the lane change may be switched to the power saving mode only when an area in the direction opposite to the direction of the lane change is an object undetected area based on the sensing data measured by the sensors. Accordingly, since the sensors corresponding to the direction opposite to the direction of the lane change are switched to the power saving mode during the lane change only when an object is not detected in the direction opposite to the direction of the lane change, power consumption can be reduced while safety is ensured.

In an embodiment, operation S43 may further include an operation of obtaining road driving information received through a wireless communication interface provided in the vehicle and an operation of determining whether an adjacent area, which corresponds to a direction opposite to the direction of a lane change among a plurality of adjacent areas, is an object undetected area using the road driving information.

Here, operation S43 may include an operation of outputting a control signal for controlling some sensors, which correspond to the direction opposite to the direction of the lane change among a plurality of sensors provided in the vehicle, to operate in the power saving mode when the adjacent area corresponding to the direction opposite to the direction of the lane change is determined as an object undetected area based on both the road driving information and the sensing data and when it is determined that the vehicle has started to change lanes.

For example, even if there is a lane change, sensors located in a direction opposite to the direction of the lane change may be switched to the power saving mode only when an area in the direction opposite to the direction of the lane change is determined as an object undetected area with reference to both the road driving information and the sensing data. Accordingly, during the lane change, the sensors located in the direction opposite to the direction of the lane change can be switched to the power saving mode while a safer environment is ensured.

As described above, in the method according to the embodiment of the present disclosure, it is possible to reduce the power consumption of sensors built in the vehicle within a range in which the safety of vehicle driving is ensured. In addition, when the driving environment of the vehicle changes, the operation mode of the sensors built in the vehicle can be rapidly switched for efficient power management.

Figure 5:
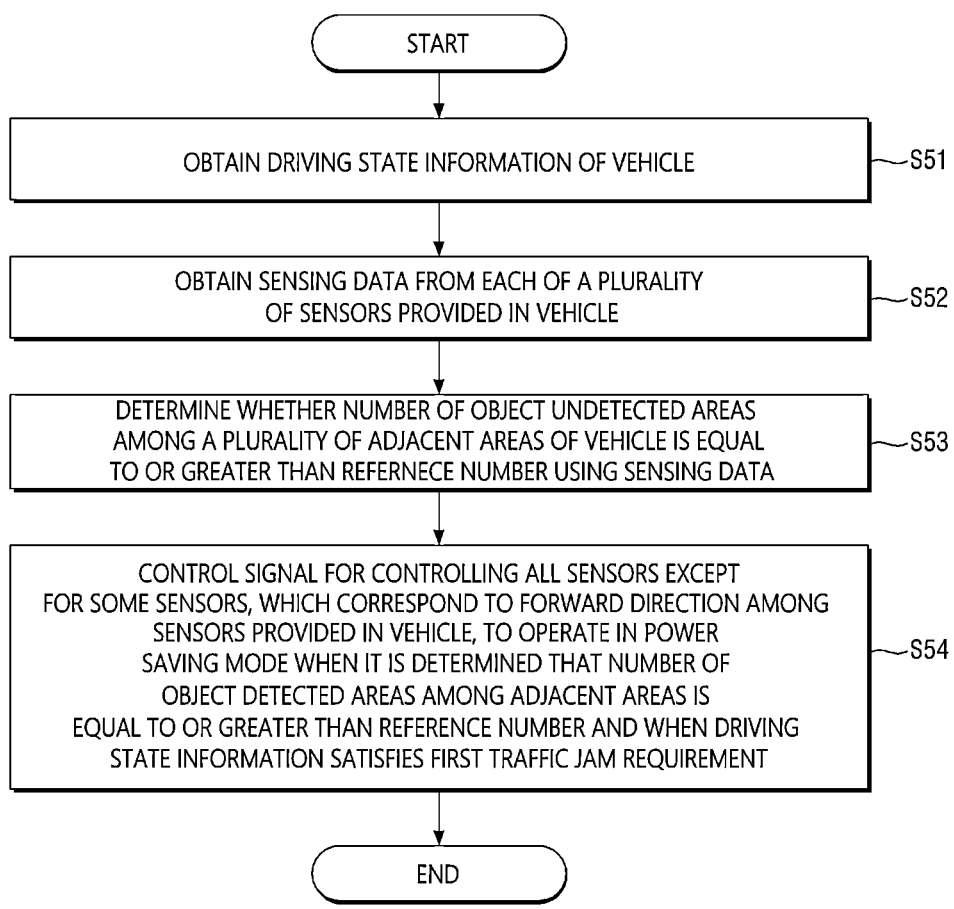

Referring to FIG. 5, first, in operation S51, driving state information of a vehicle is obtained. In FIG. 52, sensing data is obtained from each of a plurality of sensors provided in the vehicle.

Next, in operation S53, it is determined whether the number of object detected areas among a plurality of adjacent areas of the vehicle is equal to or greater than a reference number using the sensing data.

Finally, in operation S54, when it is determined that the number of object detected areas among the adjacent areas is equal to or greater than the reference number and when the driving state information satisfies a first traffic jam requirement, a control signal for controlling all sensors except for some sensors, which correspond to a forward direction among the sensors provided in the vehicle, to operate in a power saving mode is output. Here, the first traffic jam requirement may include a case where a turn signal is turned off, a case where a steering angle is less than a reference angle, a case where a driving speed is less than a reference speed, and a case where a left lane or a right lane is not approached.

Accordingly, even if objects are detected in all adjacent areas such as front, rear, and side areas, when it is determined based on the driving state information that traffic is congested, sensors except for some essential front sensors may be switched to the power saving mode.

In an embodiment, operation S54 may include an operation of outputting a control signal for controlling all sensors except for some sensors, which correspond to the forward direction among the sensors provided in the vehicle, to operate in the power saving mode when it is determined that the number of object detected areas among the adjacent areas is equal to or greater than the reference number, when the driving state information satisfies the first traffic jam requirement, and when road driving information satisfies a second traffic jam requirement.

Accordingly, even if objects are detected in all adjacent areas, when it is determined based on the driving state information and the road driving information received from the outside that traffic is congested, sensors except for some essential front sensors may be switched to the power saving mode.

Figure 6:
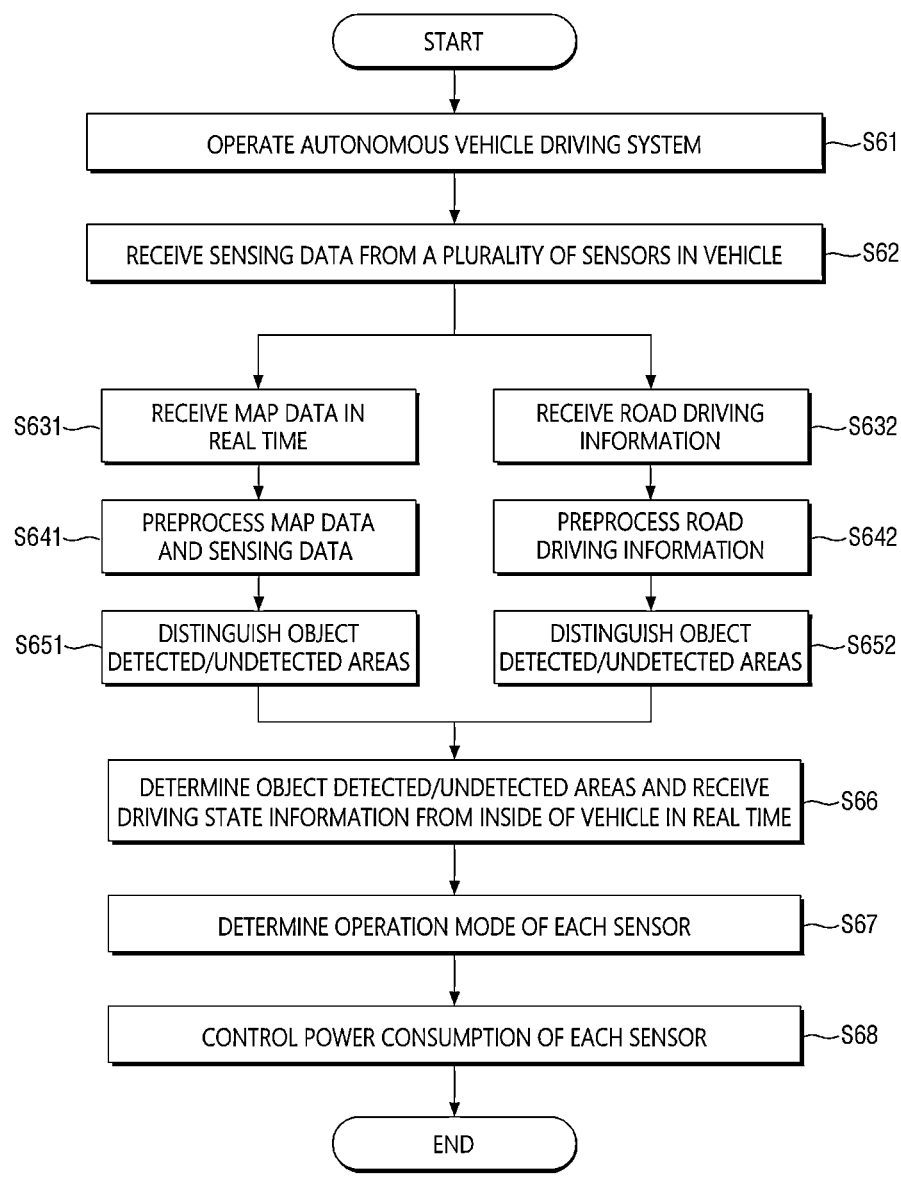

Referring to FIG. 6, first, when an autonomous vehicle driving system is operated in operation S61, sensing data is received from a plurality of sensors in a vehicle in operation S62.

Next, in operation S631, map data is received from a map information system 70 in real time. In operation S641, the map data and the sensing data are preprocessed. Here, the preprocessing of the data may include a process of extracting and processing only related data from the map data and the sensing data based on the location of the vehicle.

In operation S651, an object detected area and an object undetected area are distinguished using the data preprocessed in operation S641.

While operations S631, S641 and S651 are performed as described above, operations S632, S642, and S652 may be performed separately.

In operation S632, road driving information is received from a road traffic system 60 in real time. In operation S642, the road driving information is preprocessed. Here, the preprocessing of the road driving information may include a process of extracting and processing only related data from the road driving information based on the location of the vehicle.

In operation S652, an object detected area and an object undetected area are distinguished using the data preprocessed in operation S642.

Next, in operation S66, an object detected area and an object undetected area are determined based on the results of operations S651 and S652, and driving state information is received from the inside of the vehicle in real time. The driving state information may be generated using data such as a steering angle, whether a turn signal is turned on, the speed of the vehicle, and a lane change signal in the case of an autonomous vehicle. The driving state information may include information about whether traffic is congested or flowing freely and information about whether the vehicle is stopped, is driving, or is changing lanes.

In operation S67, an operation mode of each sensor is determined using information about the object undetected area determined in operation S66 and the driving state information. Here, the operation mode of each sensor may be determined to be a power saving mode or a normal mode.

Finally, in operation S68, the power consumption of each sensor is controlled according to the determined operation mode.

For example, when an area sensed by any one camera sensor in the vehicle is an object undetected area and when it is determined based on the driving state information that traffic is flowing freely, the camera sensor may be operated in the power saving mode.

For another example, when an area sensed by any one lidar sensor provided in the vehicle is an object undetected area and when it is determined based on the driving state information that the vehicle has started to change lanes in a direction opposite to the sensor, the lidar sensor may be operated in the power saving mode.

As described above, in the method according to the embodiment of the present disclosure, it is possible to effectively reduce power consumption by switching each sensor provided in the vehicle to the power saving mode or the normal mode according to the driving environment with reference to the road driving information received through a wireless communication interface, the map data, and the driving state information.

Figure 7:
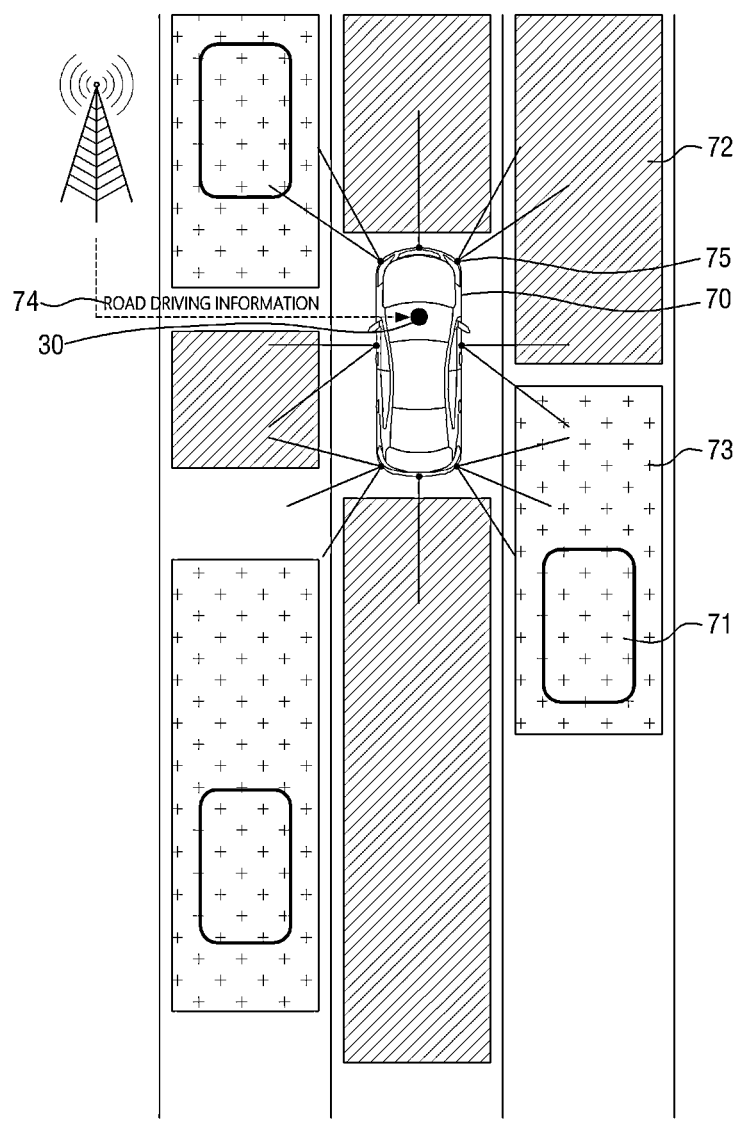
FIG. 7 is an example of determining an exemplary object detected area and an exemplary object undetected area, which may be provided in some embodiments of the present disclosure.

FIG. 7 is an example of determining an exemplary object detected area and an exemplary object undetected area, which may be provided in some embodiments of the present disclosure. Referring to FIG. 7, according to an embodiment of the present disclosure, an autonomous vehicle 70 travelling on a road may determine an object detected area 73 and an object undetected area 72 using road driving information 74 received from the outside through a wireless communication interface such as 5G and data regarding the presence or absence of an object received from a plurality of sensors 75 provided in the vehicle 70.

For example, when an object is not detected in an area being sensed by any one camera sensor among the sensors 75, the area being sensed may be determined as the object undetected area 72, and the camera sensor may be switched to a power saving mode to reduce power consumption.

Figure 8:
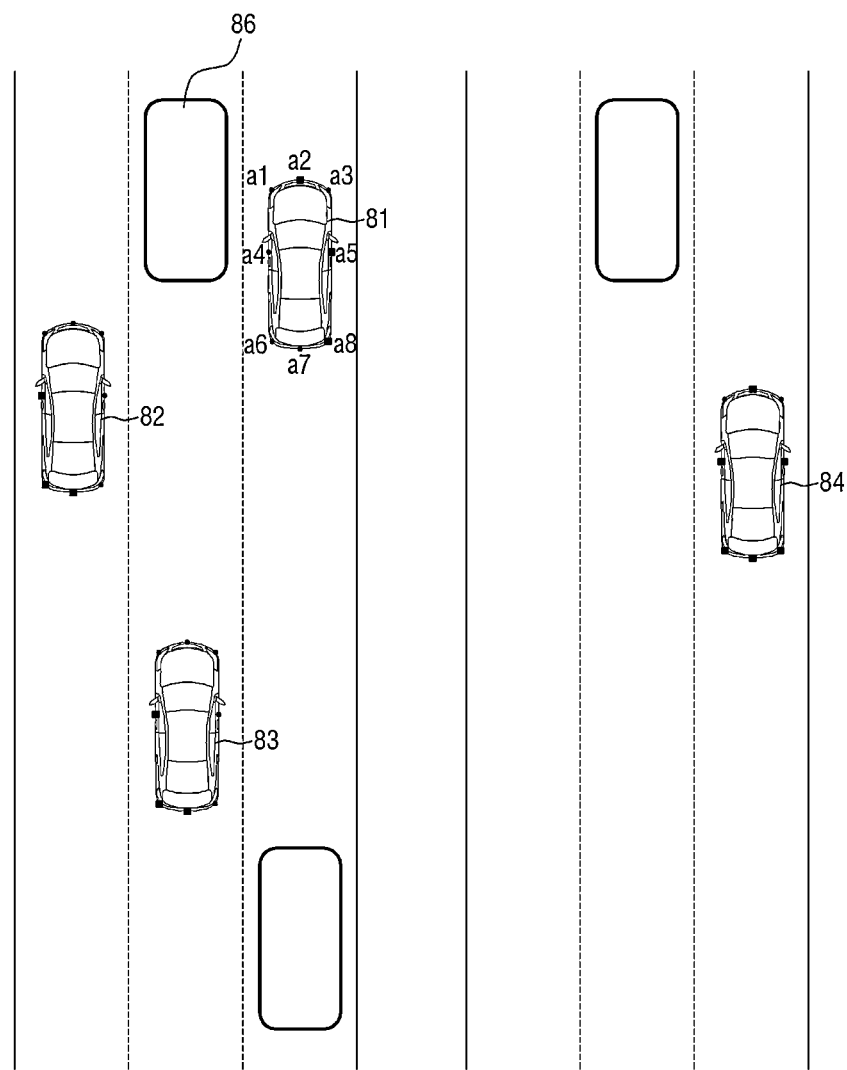
FIG. 8 is an example of changing the operation mode of sensors corresponding to an exemplary object undetected area, which may be provided in some embodiments of the present disclosure.

FIG. 8 is an example of changing the operation mode of sensors corresponding to an exemplary object undetected area, which may be provided in some embodiments of the present disclosure. Referring to FIG. 8, according to an embodiment of the present disclosure, a first autonomous vehicle 81 travelling on a road may determine the operation mode of each sensor using road driving information received through 5G and sensing data of sensors a1 through a8 provided in the vehicle 81 and may apply a power control data value of each sensor according to the operation mode.

In the illustrated example, when the first autonomous vehicle 81 detects an object 86 in a left lane using the road driving information and the sensing data, it may set sensors a1, a4, a6 and a7 corresponding to the left lane to a normal mode and the other sensors a2, a3, a5 and a8 to a power saving mode. Accordingly, it is possible to efficiently control power consumption by operating not all sensors, but switching the sensors a2, a3, a5 and a8 corresponding to an area in which the object 86 is not detected to the power saving mode.

Likewise, a second autonomous vehicle 82, a third autonomous vehicle 83, and a fourth autonomous vehicle 84 can reduce power consumption by switching sensors corresponding to an area in which an object is not detected to the power saving mode.

Figure 9:
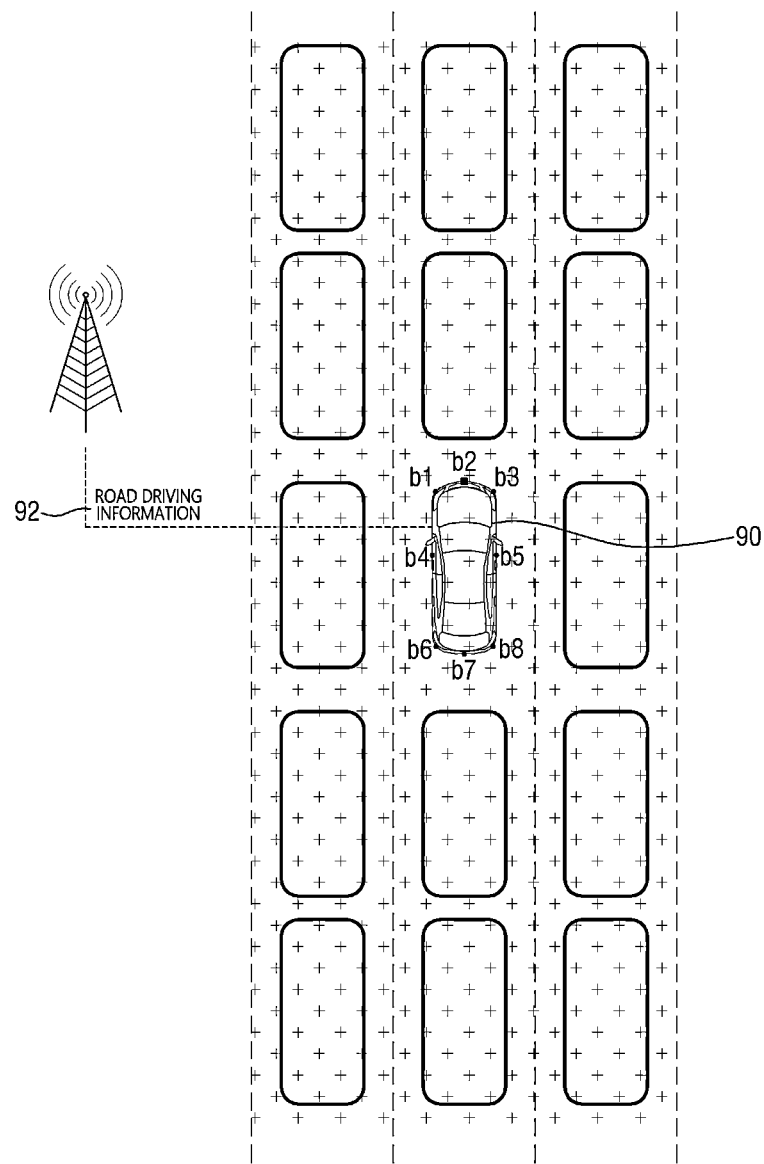
FIG. 9 is an example of changing the operation mode of sensors in an exemplary traffic jam state, which may be provided in some embodiments of the present disclosure.

FIG. 9 is an example of changing the operation mode of sensors in an exemplary traffic jam state, which may be provided in some embodiments of the present disclosure. Referring to FIG. 9, according to an embodiment of the present disclosure, a vehicle 90 travelling on a road may determine that a driving environment is in a traffic jam state using road driving information 92 received through 5G, sensing data of sensors b1 through b8 provided in the vehicle 90, and driving state information.

For example, when the driving speed is 30 km/h or less, a turn signal is off, a left or right lane is not approached within 30 cm, and objects are detected in all adjacent areas, it may be determined that traffic is congested. Accordingly, all sensors b1, b3, b4, b5, b6, b7 and b8 except for the front sensor b2 may be operated in the power saving mode.

Figure 10:
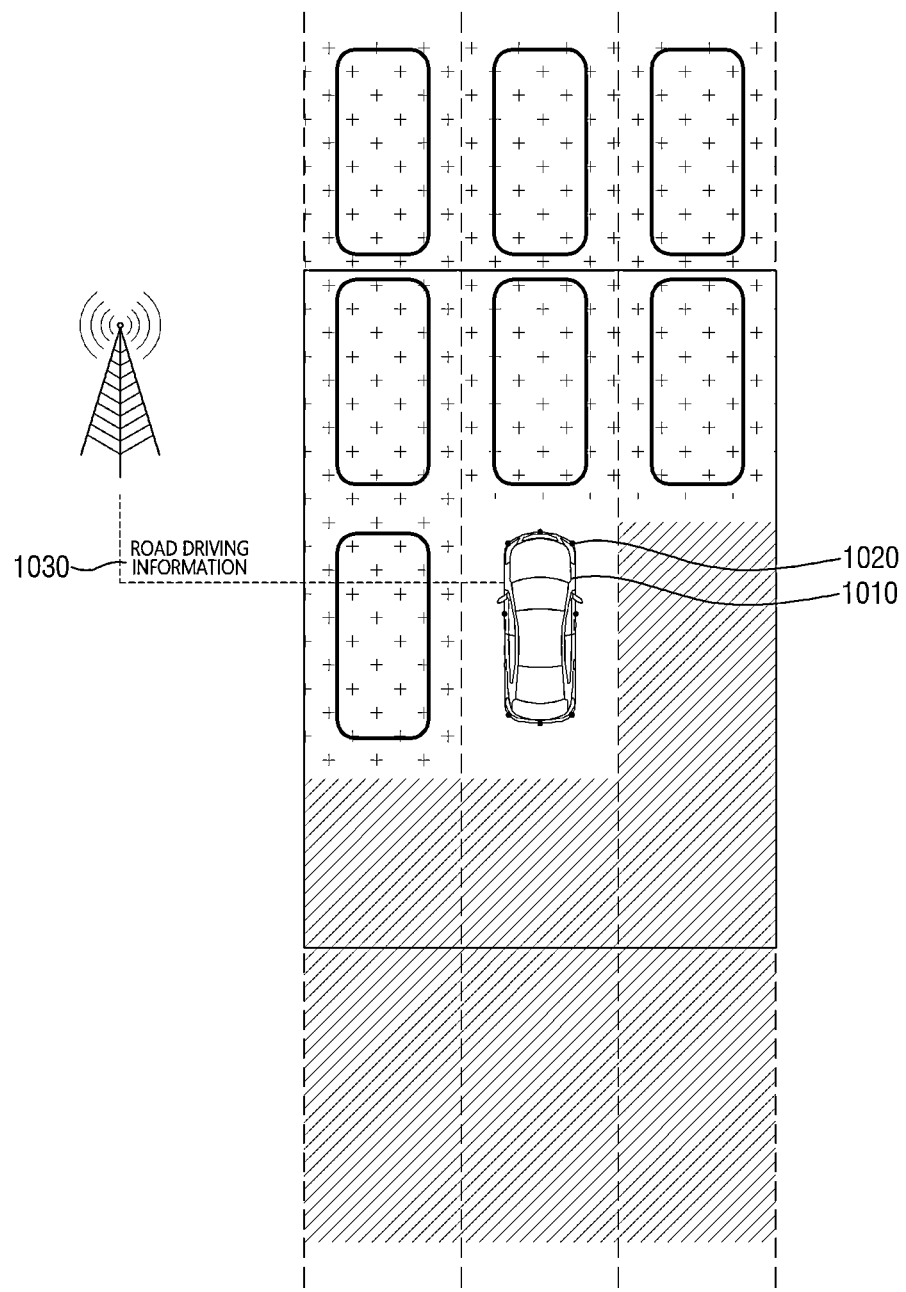
FIG. 10 is an example of changing the operation mode of sensors in an exemplary driving stop state, which may be provided in some embodiments of the present disclosure.

FIG. 10 is an example of changing the operation mode of sensors in an exemplary driving stop state, which may be provided in some embodiments of the present disclosure. Referring to FIG. 10, according to an embodiment of the present disclosure, a vehicle 1010 travelling on a road may determine that a driving environment is in a driving stop state using road driving information 1030 received through 5G, sensing data of sensors provided in the vehicle 1010, and driving state information.

For example, when the brake is on, when the auto hold is on, or in a parking state, it may be determined that the vehicle 1010 has been stopped. Accordingly, all sensors may be operated in a power saving mode.

Figure 11:
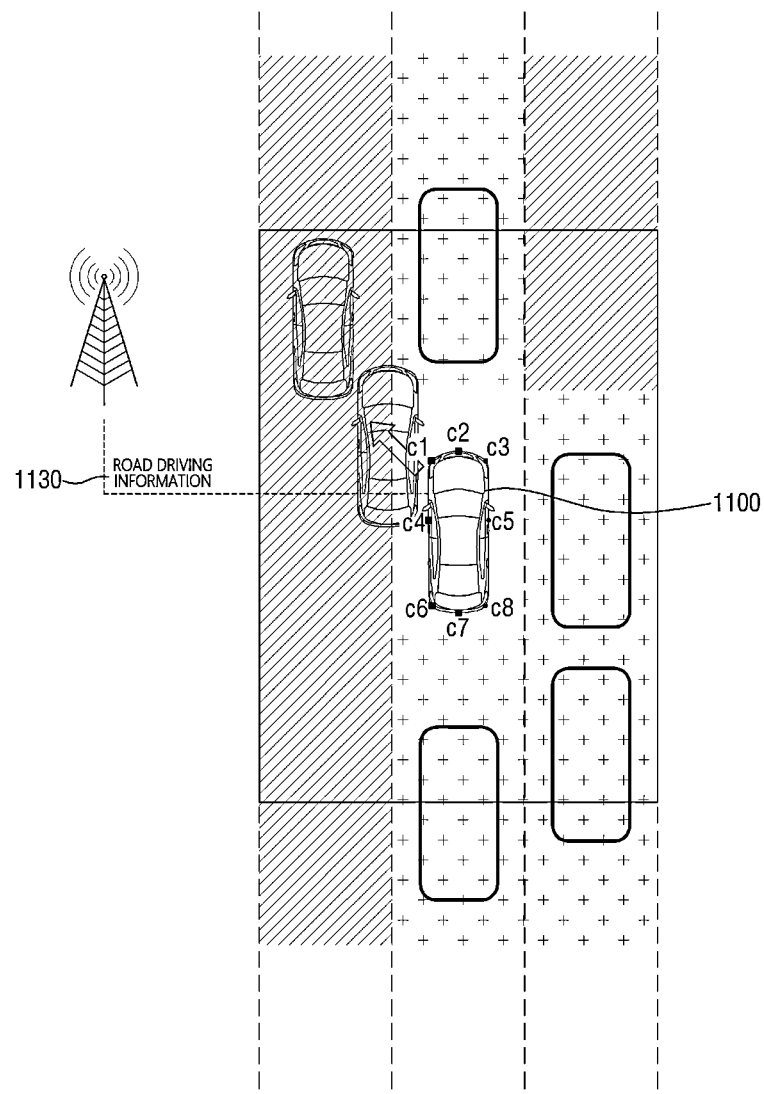
FIGS. 11 and 12 are examples of changing the operation mode of sensors in an exemplary lane change state during driving, which may be provided in some embodiments of the present disclosure.
Figure 12:
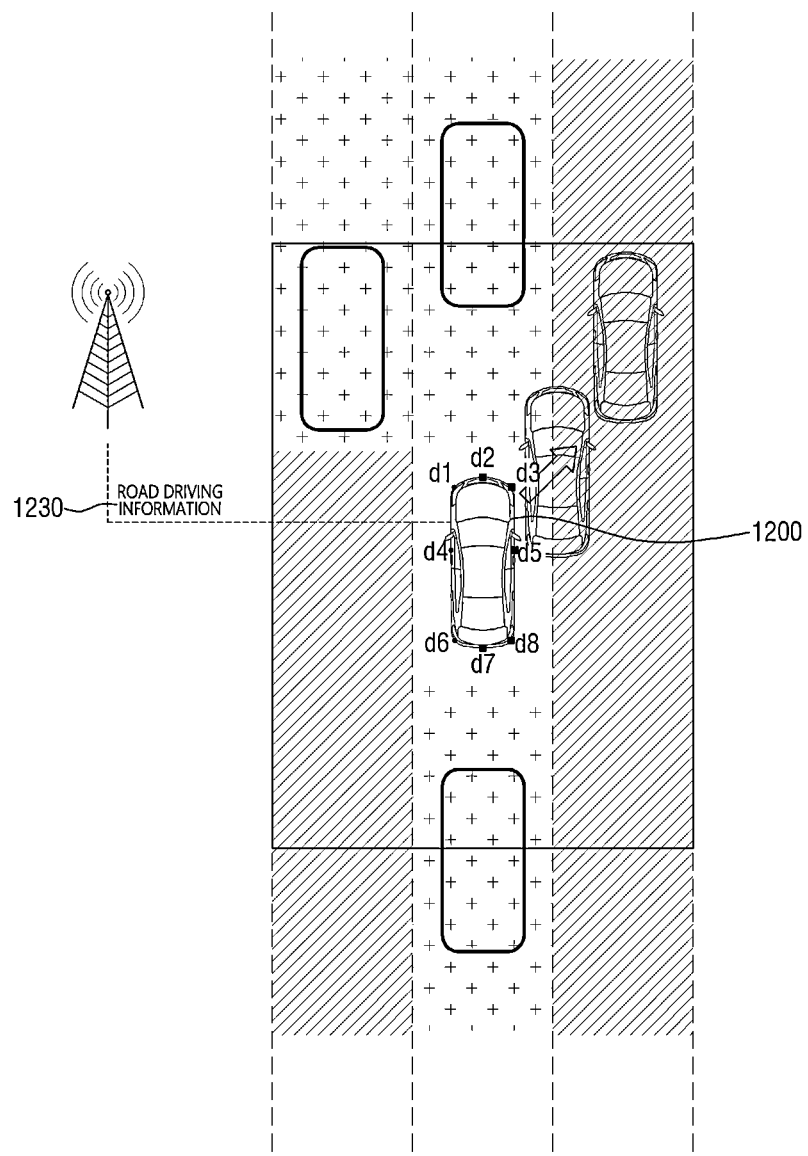

FIGS. 11 and 12 are examples of changing the operation mode of sensors in an exemplary lane change state during driving, which may be provided in some embodiments of the present disclosure.

Referring to FIG. 11, according to an embodiment of the present disclosure, a vehicle 1100 travelling on a road may determine that a driving environment is in a left lane change state using road driving information 1130 received through 5G, sensing data of sensors c1 through c8 provided in the vehicle 1100, and driving state information.

For example, when a left turn signal is on, when the vehicle speed is 30 km/h or more, or when a left lane is approached within 30 cm, it may be determined that a left lane change has started. Accordingly, sensors c3, c5 and c8 corresponding to a direction opposite to the left lane may be switched to a power saving mode.

Referring to FIG. 12, according to an embodiment of the present disclosure, a vehicle 1200 travelling on a road may determine that a driving environment is in a right lane change state using road driving information 1230 received through 5G, sensing data of sensors d1 through d8 provided in the vehicle 1200, and driving state information.

For example, when a right turn signal is on, when the vehicle speed is 30 km/h or more, or when a right lane is approached within 30 cm, it may be determined that a right lane change has started. Accordingly, sensors c1, c4 and c6 corresponding to a direction opposite to the right lane may be switched to a power saving mode.

An exemplary computing device 100 capable of implementing the apparatus described in various embodiments of the present disclosure will now be described with reference to FIG. 13.

Figure 13:
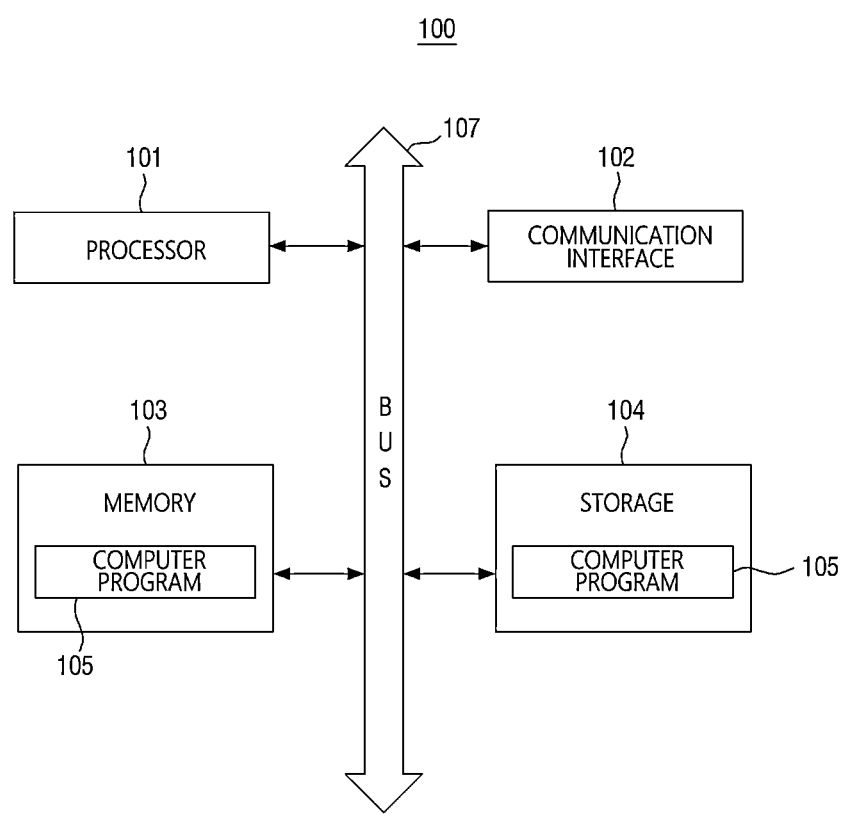
FIG. 13 illustrates the hardware configuration of a computing device according to an embodiment of the present disclosure.

FIG. 13 is a hardware configuration diagram of an exemplary computing device capable of implementing methods according to some embodiments of the present invention.

Referring to FIG. 13, the computing device 100 may include one or more processors 101, a bus 107, a communication interface 102, a memory 103, which loads a computer program 105 executed by the processors 101, and a storage 104 for storing the computer program 105. However, FIG. 13 illustrates only the components related to the embodiment of the present disclosure. Therefore, it will be appreciated by those skilled in the art that the present disclosure may further include other general purpose components in addition to the components shown in FIG. 13.

The processor 101 controls overall operations of each component of computing device 100. The processor 101 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 101 may perform calculations on at least one application or program for executing a method/operation according to various embodiments of the present disclosure. The computing device 100 may have one or more processors.

The memory 103 stores various data, instructions and/or information. The memory 103 may load one or more programs 105 from the storage 104 to execute methods/operations according to various embodiments of the present disclosure. For example, when the computer program 105 is loaded into the memory 103, the logic (or the module may be implemented on the memory 103. An example of the memory 103 may be a RAM, but is not limited thereto.

The bus 107 provides communication between components of computing device 100. The bus 107 may be implemented as various types of bus such as an address bus, a data bus and a control bus.

The communication interface 102 supports wired and wireless internet communication of the computing device 100. The communication interface 102 may support various communication methods other than internet communication. To this end, the communication interface 102 may be configured to comprise a communication module well known in the art of the present disclosure.

The storage 104 can non-temporarily store one or more computer programs 105. The storage 104 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, on which the methods/operations according to various embodiments of the present disclosure are implemented. When the computer program 105 is loaded on the memory 103, the processor 101 may perform the methods/operations in accordance with various embodiments of the present disclosure by executing the one or more instructions.

As described above, according to the computing device 100 of an embodiment of the present invention, it is possible to efficiently manage power consumption by controlling the operation of sensors built in the vehicle by analyzing a driving environment of the vehicle. Further, it is possible to reduce power consumption of sensors built in the vehicle within a range in which the safety of vehicle driving is ensured.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A method of reducing power consumption of sensors, the method being performed by a sensor control apparatus provided in a vehicle and comprising:
    obtaining driving state information of the vehicle;
    determining whether the vehicle has started to change lanes;
    determining a lane change direction of the vehicle; and
    outputting a first control signal for controlling a first set of sensors, among a plurality of sensors provided in the vehicle, to operate in a power saving mode when it is determined that the vehicle has started to change the lanes, wherein the first set of sensors correspond to a direction opposite to the lane change direction.

2. The method of claim 1, further comprising:
    determining whether the vehicle has finished changing the lanes using at least a part of the driving state information; and
    outputting a second control signal for controlling the first set of sensors operating in the power saving mode to switch to a normal mode when it is determined that the vehicle has finished changing the lanes.

3. The method of claim 1, wherein the outputting of the first control signal comprises:
    obtaining road driving information through a wireless communication interface provided in the vehicle;
    obtaining a degree of congestion at a location of the vehicle using the road driving information; and
    outputting the first control signal for controlling the first set of sensors to operate in the power saving mode when the degree of congestion is less than a congestion reference level and when it is determined that the vehicle has started to change the lanes.

4. The method of claim 1, wherein the outputting of the control signal comprises:
    obtaining a driving speed of the vehicle using at least a part of the driving state information; and
    outputting the first control signal for controlling the first set of sensors to operate in the power saving mode when the driving speed is equal to or higher than a predefined speed and when it is determined that the vehicle has started to change the lanes.

5. The method of claim 1, wherein the outputting of the first control signal comprises:
    obtaining sensing data from the plurality of sensors provided in the vehicle;
    determining whether a first adjacent area, among a plurality of adjacent areas, is an object undetected area using the sensing data, the first adjacent area corresponding to a direction opposite to the lane change direction; and
    outputting the first control signal for controlling the first set of sensors to operate in the power saving mode when the first adjacent area is determined as the object undetected area and when it is determined that the vehicle has started to change the lanes.

6. The method of claim 5, wherein the outputting of the first control signal further comprises:

obtaining road driving information through a wireless communication interface provided in the vehicle;

determining whether the first adjacent area, which corresponds to the direction opposite to the lane change, is an object undetected area using the road driving information; and outputting the first control signal for controlling the first set of sensors to operate in the power saving mode when the first adjacent area is determined as the object undetected area based on both the road driving information and the sensing data, and when it is determined that the vehicle has started to change the lanes.

* * * * *